US011547917B2

(12) United States Patent
Xing et al.

(10) Patent No.: US 11,547,917 B2
(45) Date of Patent: Jan. 10, 2023

(54) SURFING SIMULATION DEVICE AND SURFING SIMULATION METHOD

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 300 days.

(21) Appl. No.: 16/858,526

(22) Filed: Apr. 24, 2020

(65) Prior Publication Data

US 2021/0162287 A1  Jun. 3, 2021

(30) Foreign Application Priority Data

Nov. 28, 2019 (CN) .......................... 201911195472.6

(51) Int. Cl.
*A63B 69/00* (2006.01)
*A63B 71/06* (2006.01)
*G06F 3/01* (2006.01)

(52) U.S. Cl.
CPC ...... *A63B 69/0093* (2013.01); *A63B 71/0622* (2013.01); *G06F 3/012* (2013.01);
(Continued)

(58) Field of Classification Search
CPC ............ A63B 69/0093; A63B 71/0622; A63B 2071/0638; A63B 2071/0666; A63B 2209/08; A63B 2220/52; A63B 2225/50; A63B 24/0087; A63B 2024/009; A63B 2071/0625; A63B 2220/10; A63B 2220/40; A63B 2220/801; A63B 2220/803; A63B 2220/808; A63B 2225/54; A63B 69/0066; G06F 3/012; G09B 9/066

See application file for complete search history.

(56) References Cited

U.S. PATENT DOCUMENTS

2015/0303768 A1   10/2015  Henderson et al.
2017/0368413 A1*  12/2017  Shavit ................ A63B 24/0075

FOREIGN PATENT DOCUMENTS

CA     2130980 A1    2/1996
CN    101780321 A    7/2010
(Continued)

OTHER PUBLICATIONS

Extended European Search Report in Application No. 20175794, dated Nov. 13, 2020.
(Continued)

*Primary Examiner* — Jeffrey S Vanderveen
(74) *Attorney, Agent, or Firm* — Syncoda LLC; Feng Ma

(57) ABSTRACT

A surfing simulation device can be wirelessly connected with virtual reality (VR) glasses. The surfing simulation device includes a surfboard, a surfboard base, and a controller disposed in the surfboard base. The controller controls the actions of the surfboard based on scene information associated with a surfing scene displayed in the VR glasses, such that the actions of the surfboard are synchronous with the surfing scene displayed in the VR glasses. The surfboard of the surfing simulation device can make simulating actions in real time by synchronizing with a surfing scene displayed in VR glasses, such that users can experience the immersive feeling.

19 Claims, 6 Drawing Sheets

(52) U.S. Cl.
CPC ........... *A63B 2071/0638* (2013.01); *A63B 2071/0666* (2013.01); *A63B 2209/08* (2013.01); *A63B 2220/52* (2013.01); *A63B 2225/50* (2013.01)

(56) References Cited

FOREIGN PATENT DOCUMENTS

| | | | | |
|---|---|---|---|---|
| CN | 204699350 U | 10/2015 | | |
| KR | 20190059482 A | 5/2019 | | |
| TW | 201010771 A | * | 3/2010 | |
| TW | 201010771 A | | 3/2010 | |
| WO | WO-9516253 A1 | * | 6/1995 | ........... B60G 17/015 |
| WO | WO-2019240974 A1 | * | 12/2019 | ............. A61H 1/003 |

OTHER PUBLICATIONS

CN First Office Action in Application No. 201911195472.6, dated Oct. 16, 2020.

\* cited by examiner

SURFING SIMULATION DEVICE AND SURFING SIMULATION METHOD

CROSS-REFERENCE TO RELATED APPLICATION

This application claims priority to Chinese Patent Application No. 201911195472.6 filed on Nov. 28, 2019, the disclosure of which is hereby incorporated by reference in its entirety.

BACKGROUND

With increasing demands for virtual reality (VR) visual effects, VR technologies have evolved quickly. VR technologies let users experience visual, auditory and tactile simulation by establishing virtual information environments. At present, VR technologies are widely used in fields of gaming for leisure and entertainment, and various fields of simulation training. For example, users can wear VR glasses to observe the game screen and experience the virtual environment.

SUMMARY

The present disclosure relates generally to the field of surfing simulation technologies, and more specifically to a surfing simulation device and a surfing simulation method.

According to one aspect of the embodiments of the present disclosure, there is provided a surfing simulation device, which is wirelessly connected with VR glasses and comprises: a surfboard, a surfboard base, and a controller disposed in the surfboard base, wherein the controller is configured to control actions of the surfboard based on scene information associated with a surfing scene displayed in the VR glasses, such that the actions of the surfboard are synchronous with the surfing scene displayed in the VR glasses.

In some embodiments of the present disclosure, the surfboard is coupled with the surfboard base by magnetic suspension.

In some other embodiments of the present disclosure, the controlling the actions of the surfboard according to the scene information associated with the surfing scene displayed in the VR glasses includes: allowing the controller to adjust induced eddy current of the surfboard base according to the scene information; adjusting magnetic force that supports the surfboard according to the adjusted induced eddy current; and controlling the actions of the surfboard in accordance with the adjusted magnetic force.

In some other embodiments of the present disclosure, in the present disclosure, the scene information includes moving path information and/or sea wave information corresponding to a time; the moving path information includes direction, speed, and acceleration of plane movement; and the sea wave information includes surf angle, surf speed, and surf frequency.

In some other embodiments of the present disclosure, the surfing simulation device further comprises: a gravity-sensitive switch configured to allow the surfing simulation device to operate only when a body carried by the surfing simulation device has weight over a preset value.

According to another aspect of the embodiments of the present disclosure, there is provided a surfing simulation method, which is applied to a surfing simulation device wirelessly connected with VR glasses, and comprises: receiving scene information associated with a surfing scene displayed in the VR glasses sent by the VR glasses; and controlling actions of the surfing simulation device according to the scene information, such that the actions are synchronous with the surfing scene displayed in the VR glasses.

In some embodiments of the present disclosure, the surfing simulation device comprises a surfboard and a surfboard base which are connected with each other by magnetic suspension; and the controlling the actions of the surfing simulation device includes: adjusting the induced eddy current of the surfboard base according to the scene information, so as to adjust magnetic force that supports the surfboard, and controlling the actions of the surfing device through the adjusted magnetic force.

According to still another aspect of the embodiments of the present disclosure, there is provided a surfing simulation method, which is applied to VR glasses and comprises: displaying a surfing scene selected by a user in response to a selection operation of the user; and sending scene information associated with the surfing scene to an associated surfing simulation device, wherein the scene information is used for controlling the actions of the surfing simulation device, such that the actions are synchronous with the surfing scene displayed in the VR glasses.

In some embodiments of the present disclosure, the surfing simulation method further comprises: receiving a surfing scene sent by the user through an associated mobile terminal.

According to still another aspect of the embodiments of the present disclosure, there is provided a surfing simulation device, which is wirelessly connected with VR glasses and comprises: a receiving component configured to receive scene information associated with a surfing scene displayed in the VR glasses sent by the VR glasses; and a control component configured to control actions of the surfing simulation device according to the scene information, such that the actions are synchronous with the surfing scene displayed in the VR glasses.

In some embodiments, the surfing simulation device comprises a surfboard and a surfboard base coupled with each other by magnetic suspension; and the control component controls the actions of the surfing simulation device by the following means: adjusting induced eddy current of the surfboard base according to the scene information, so as to adjust magnetic force that supports the surfboard, and controlling the actions of the surfing device through the adjusted magnetic force.

According to still another aspect of the embodiments of the present disclosure, there is provided Virtual reality (VR) glasses which comprise: a display component configured to display a surfing scene selected by a user in response to a selection operation of the user; and a sending component configured to send scene information associated with the surfing scene to an associated surfing simulation device, wherein the scene information is used for controlling actions of the surfing simulation device, such that the actions are synchronous with the surfing scene displayed in the VR glasses.

In some embodiments, the surfing simulation device further comprises a receiving component which is configured to receive the surfing scene sent by the user through an associated mobile terminal.

According to still another aspect of the embodiments of the present disclosure, there is provided a surfing simulation system comprising the above surfing simulation device, further comprising the VR glasses.

In some embodiments, the VR glasses are configured to display a surfing scene selected by a user in response to a selection operation of the user; and send scene information associated with the surfing scene to an associated surfing simulation device, wherein the scene information is used for controlling the actions of the surfing simulation device, such that the actions are synchronous with the surfing scene displayed in the VR glasses.

In some embodiments, the surfboard of the surfing simulation device is configured to make simulating actions in real time by synchronizing with the surfing scene displayed in VR glasses to thereby provide a user with immersive experience In some embodiments, the surfing simulation system further comprises a mobile terminal wirelessly coupled with the VR glasses.

In some embodiments, the VR glasses are configured to download surfing scenes from the mobile terminal and store the surfing scenes in the VR glasses in advance.

In some embodiments, the VR glasses are configured to load and display various scenes from the mobile terminal to realize real-time content synchronization between the VR glasses and the mobile terminal.

In some embodiments, the surfboard and the surfboard base are provided with superconductor electromagnets coils to generate repulsive forces, to thereby suspend the surfboard above the surfboard; and wherein the real-time content comprises real time sea wave information from a user-selected location, and multiple user information at the user-selected location, such that the VR glasses display scenes simultaneously including the real time sea wave information and the multiple user information.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the disclosure and, together with the disclosure, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Various embodiments of the present disclosure provide a surfing simulation device. The surfboard of the surfing simulation device can make simulating actions in real time by synchronizing with a surfing scene displayed in VR glasses, so as to improve users' immersive experience.

Figure 1:
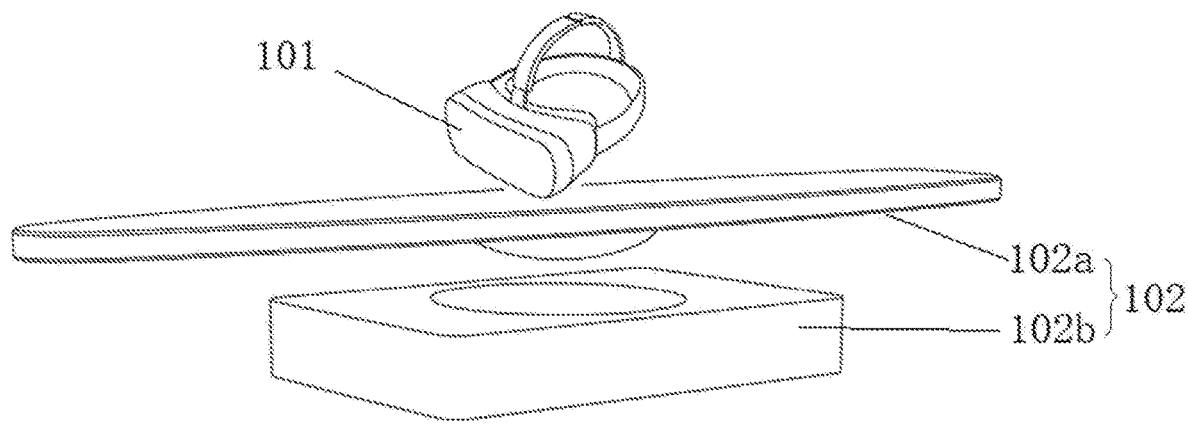
FIG. 1 is a schematic diagram illustrating a surfing simulation device and VR glasses in accordance with some embodiments.
Figure 2:
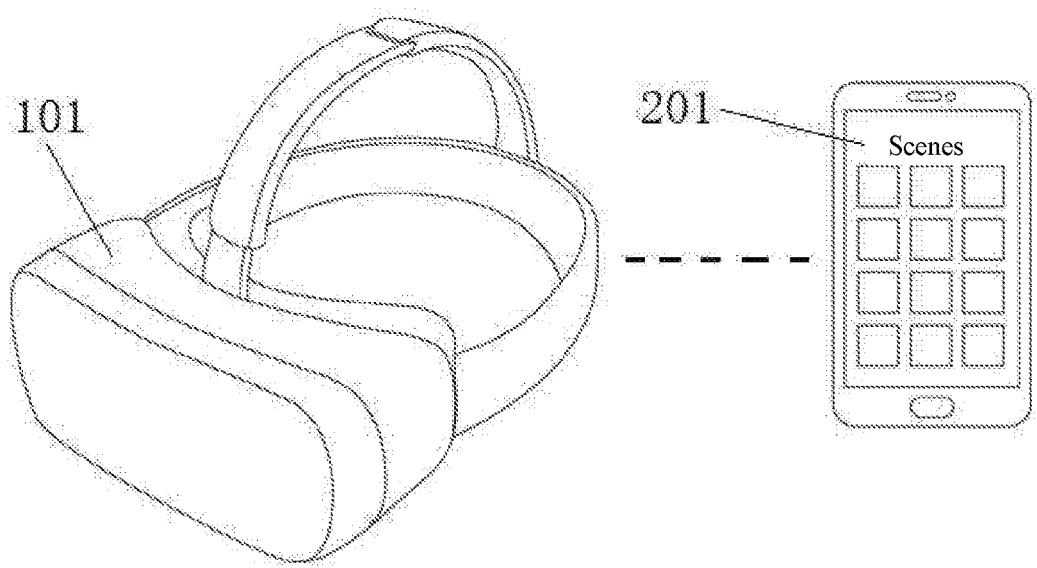
FIG. 2 is a schematic diagram illustrating a scene of using the surfing simulation device in accordance with some embodiments.
Figure 3:
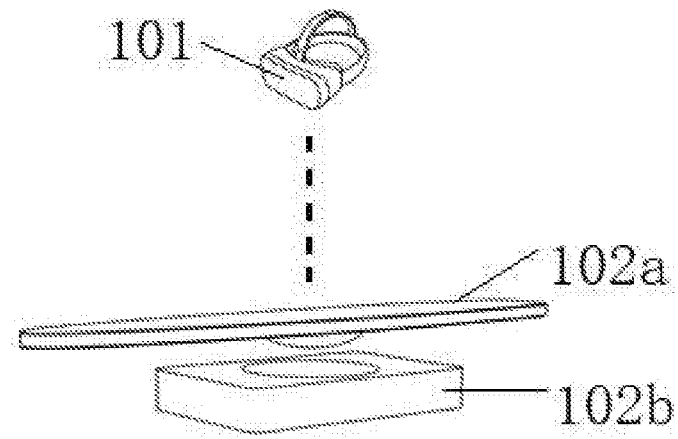
FIG. 3 is schematic diagram illustrating another scene of using the surfing simulation device in accordance with some embodiments.

FIG. 1 is a schematic diagram illustrating a surfing simulation device and VR glasses in accordance with some embodiments. FIG. 2 is a schematic diagram illustrating a scene of using the surfing simulation device in accordance with some embodiments. FIG. 3 is a schematic diagram illustrating another scene of using the surfing simulation device in accordance with some embodiments.

Referring to FIGS. 1 to 3, a surfing simulation device 102 includes a surfboard 102*a*, a surfboard base 102*b* and a controller. VR glasses 101 may be connected with the surfing simulation device 102 via Bluetooth, but the present disclosure is not limited thereto. The VR glasses 101 may also be connected with the surfing simulation device 102 by other wireless connection means of realizing data transmission such as WIFI, Ethernet and general packet radio service (GPRS), etc.

Referring to FIG. 2, for example, the VR glasses 101 may be coupled with a terminal device 201, and may load and display various scenes from the terminal device 201 to realize the content synchronization between the VR glasses 101 and the terminal device 201. The VR glasses 101 may realize real-time synchronization with the terminal device 201 or download surfing scenes from the terminal device 201 and store the surfing scenes in the VR glasses 101 in advance. The connection mode between the VR glasses 101 and the terminal device 201 may be Bluetooth, WIFI, Ethernet, GPRS or the like, but not limited thereto.

The terminal device 201 may be a mobile terminal, such as smart mobile phone, a notebook computer, a tablet or other electronic devices having data transmission function.

The surfing simulation device 102 connected with the VR glasses 101 can acquire scene information displayed in the VR glasses 101 from the VR glasses 101 and then make actions thereof to be synchronous with surfing scenes displayed in the VR glasses 101 based on the acquired scene information. Herein, the surfing scenes may be various game scenes, fitness scenes, entertainment scenes, training scenes or the like.

Referring to FIG. 2, for example, the surfing simulation device 102 may include a surfboard 102*a* and a surfboard base 102*b*. The surfboard 102*a* allows users to stay thereon and can be suspended under the magnetic force generated by the surfboard base 102*b* and change its actions according to various magnetic force changes. The surfboard base 102*b* can adjust the induced eddy current therein to generate magnetic force changes according to the scene information displayed in the VR glasses 101, so that the action of the surfboard 102*a* of the surfing simulation device 102 can be consistent with the action in the scene displayed in the VR glasses 101.

In some embodiments, the surfing simulation device 102 may adopt any one of electromagnetic suspension, light suspension, acoustic suspension, airflow suspension, electrostatic suspension, particle beam suspension or the like.

In some embodiments, the surfing simulation device 102 may adopt any one of normally conductive magnetic suspension, superconductive electrodynamic magnetic suspension, or permanent magnetic suspension.

In some embodiments, the surfing simulation device 102 may adopt the mode that two like magnetic poles repel each other. The surfboard 102*a* is provided with superconductor electromagnets, and the surfboard base 102*b* is provided with coils. Repulsive forces are generated between the magnetic field formed by the superconductor electromagnets of the surfboard 102*a* and the magnetic field formed by the coils of the surfboard base 102*b*, so that the surfboard 102*a* can be suspended above the surfboard base 102*b*, but the disclosure is not limited thereto. Alternatively, the surfboard 102*a* is provided with coils, and the surfboard base 102*b* is provided with superconductor electromagnets.

In some embodiments, the surfboard 102*a* is provided with electromagnets, and the surfboard base 102*b* is provided with induced steel plates. The repulsive force generated by the induced steel plate can act against the gravity of the surfboard 102*a* by controlling the current in the electromagnet of the surfboard 102*a*. The present disclosure is not limited thereto. Alternatively, the surfboard 102*a* is provided with induced steel plates, and the surfboard base 102*b* is provided with electromagnets.

In addition, the connection between the surfboard 102*a* and the surfboard base 102*b* is not limited to the suspension mode as described in the above embodiments. For example, the surfboard 102*a* and the surfboard base 102*b* are connected with each other through link mechanism, and the surfboard base 102*b* is provided with a driver. In this case, a controller of the surfing simulation device 102 controls the driver to adjust the force of supporting the surfboard 102*a* in every direction (e.g. side to side, back and forth) according to the scene information in the VR glasses 101, so as to realize the inclination of the surfboard 102*a* in every direction (e.g. side to side, back and forth).

The surfing simulation device 102 may also include a controller which may be a microprocessor. The controller may be disposed in the surfboard 102*a* or in the surfboard base 102*b*. The controller receives the scene information in the VR glasses 101, and controls the current of the electromagnet in the surfing simulation device 102 according to the scene information in the VR glasses 101, so as to generate magnetic force changes. The supporting force of the surfboard 102*a* in every direction may be adjusted to realize the inclination of the surfboard 102*a* in every direction.

More specifically, in some embodiments, the VR glasses 101 can be wirelessly connected with the terminal device 201 and the surfing simulation device 102 respectively.

The controller of the surfing simulation device 102 receives scene information recorded in the VR glasses 101. The scene information may include moving path information and/or sea wave information corresponding to a time. The moving path information includes plane coordinates in X and Y directions. The moving path information, for example, may also include the direction, speed and acceleration information of plane movement. The sea wave information includes surf angle (i.e. inclination angle of sea wave), surf speed (i.e. speed of sea wave) and surf frequency (i.e. frequency of sea wave). The inclination angle of sea wave includes 3D coordinates in X, Y, and Z directions.

The controller of the surfing simulation device 102 controls the magnetic force applied to the surfboard 102*a* according to the received plane coordinates in the X and Y directions associated with the moving path, the received 3D coordinates in the X, Y, and Z directions associated with the sea wave state, and the received sea wave speed, so that the supporting forces of the surfboard 102*a* in every direction can be different, thereby realizing changes of the inclination angle of the surfboard 102*a* in every direction and adjusting the change rate of the inclination angle. For example, when the plane movement changes slowly at a low speed, the controller of the surfing simulation device 102 adjusts the induced eddy current of the surfboard base 102*b*, so that the action of the surfboard 102*a* of the surfing simulation device 102 can be slow and consistent with the action in the scene displayed in the VR glasses 101. In contrast, when the plane movement changes rapidly at a high speed, the controller of the surfing simulation device 102 adjusts the induced eddy current of the surfboard base 102*b*, so that the action of the surfboard 102*a* of the surfing simulation device 102 can be faster and consistent with the action in the scene displayed in the VR glasses 101. Similarly, the controller of the surfing simulation device 102 may also adjust the induced eddy current of the surfboard base 102*b* according to the sea wave state information such as the surf angle, the surf speed and the surf frequency, so that the action of the surfboard 102*a* of the surfing simulation device 102 can be fast or slow and keep consistent with the action in the scene displayed in the VR glasses 101.

In some embodiments, the VR glasses 101 may include a microprocessor which analyzes the scene displayed in the VR glasses 101 and thereby acquires corresponding scene information from the scene, and then sends the moving path information and the sea wave state information included in the scene information to the controller of the surfing simulation device 102.

In some other embodiments, the controller of the surfing simulation device 102 receives the scene displayed in the VR glasses 101, analyzes the scene and thereby acquires corresponding scene information from the scene.

In some embodiments, the VR glasses 101 may be in real-time synchronization with the terminal device 201, and the controller of the surfing simulation device 102 acquires the surfing scene displayed in the VR glasses 101 in real time, analyzes the surfing scene in real time, and acquires the moving path information and the sea wave information from the surfing scene.

In some other embodiments, the VR glasses 101 may download one or more surfing scenes from the terminal device 201 in advance, and the microprocessor of the VR glasses 101 or the controller of the surfing simulation device 102 analyzes the surfing scenes stored in the VR glasses 101 in advance, and stores scene information in a memory of the surfing simulation device 102 in advance. When the VR glasses 101 display a certain surfing scene, the controller of the surfing simulation device 102 calls moving path information and sea wave information corresponding to the above scene from the memory of the surfing simulation device 102, and controls the magnetic force of the surfing simulation device 102 based on the moving path information and the sea wave information. In addition, for example, the user may bind the VR glasses 101 and the terminal device 201 in advance when using the surfing simulation device 102, so as to realize automatic matching in the subsequent use process.

In some embodiments, the VR glasses 101 may include a switch button through which the VR glasses 101 is turned on or off. The switch button may be a mechanical one or a touch button.

In some embodiments, the surfing simulation device 102 may also include a switch button to realize the ON and OFF of the surfing simulation device 102. The switch button may be disposed on the surfboard 102a or the surfboard base 102b.

In some embodiments, the VR glasses 101 may further include a connecting button. When the connecting button is switched on, the VR glasses 101 and the surfing simulation device 102 are connected. When the connecting button is switched off, the VR glasses 101 and the surfing simulation device 102 are disconnected. Alternatively, the connecting button may be disposed on the surfing simulation device 102. But the present disclosure is not limited thereto. For example, the switch button of the surfing simulation device 102 is adopted to realize the connection between the VR glasses 101 and the surfing simulation device 102 synchronously. That is, when the surfing simulation device 102 is turned on, the VR glasses 101 and the surfing simulation device 102 are connected synchronously; and when the surfing simulation device 102 is turned off, the VR glasses 101 and the surfing simulation device 102 are disconnected synchronously, thereby no separate connecting button is required.

In some embodiments, the surfing simulation device 100 may further include a starting switch. The starting switch may be disposed on the VR glasses 101 or the surfing simulation device 102. The starting switch can be switched on to start the synchronization between the VR glasses 101 and the surfing simulation device 102 and switched off to stop the synchronization between the VR glasses 101 and the surfing simulation device 102.

In some other embodiments of the present disclosure, the surfing simulation device 100 may further comprise a gravity-sensitive switch which is configured to allow the surfing simulation device 100 to operate only when a body carried by the surfing simulation device 100 has weight over a preset value.

In some other embodiments, the terminal device 201 may download an application of the surfing simulation device 100 in advance and is adopted to activate or deactivate the surfing simulation device 100, thereby no separate starting switch is required.

Figure 4:
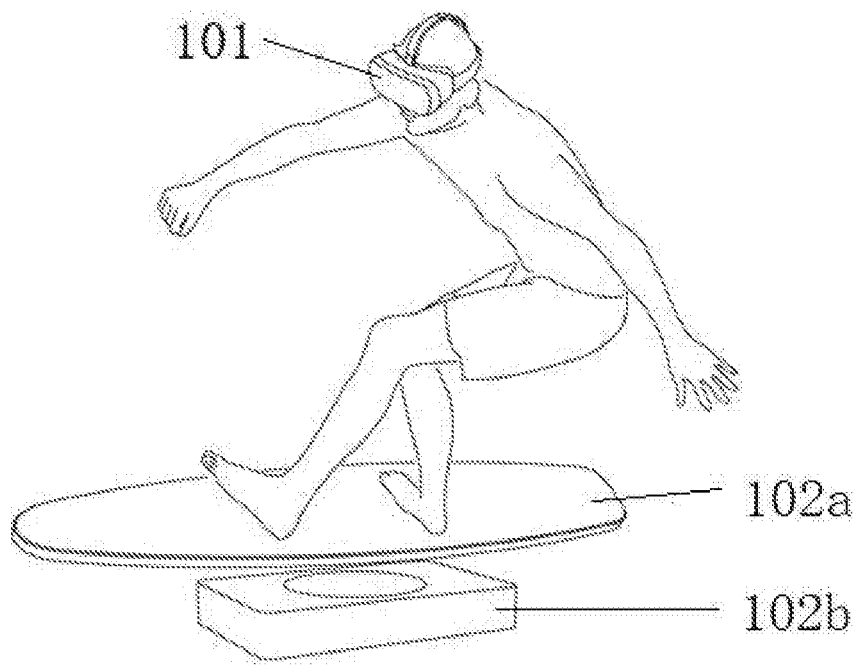
FIG. 4 is a schematic diagram illustrating still another scene of using the surfing simulation device in accordance with some embodiments.

FIG. 4 is a schematic diagram illustrating another scene of using the surfing simulation device in accordance with some embodiments. Referring to FIG. 4, for example, a user wearing the VR glasses 101 stands on the surfboard 102a of the surfing simulation device 102. The VR glasses 101 display a scene downloaded from the terminal device 201. The wave size, sea level, sea wave state and the like in the scene may change randomly. The surfboard 102a of the surfing simulation device 102 may make simulating actions (i.e. simulate the action of a real surfboard) based on the sea level, the sea wave state and the like, so that the user can have the feeling of surfing on the water by controlling the surfboard 102a through foot movements to perform and complete various difficult surfing actions with the assistance of the surfing simulation device 102. Therefore, the surfing simulation device 102, for example, may be applied in game, fitness entertainment and training, etc.

Figure 5A:
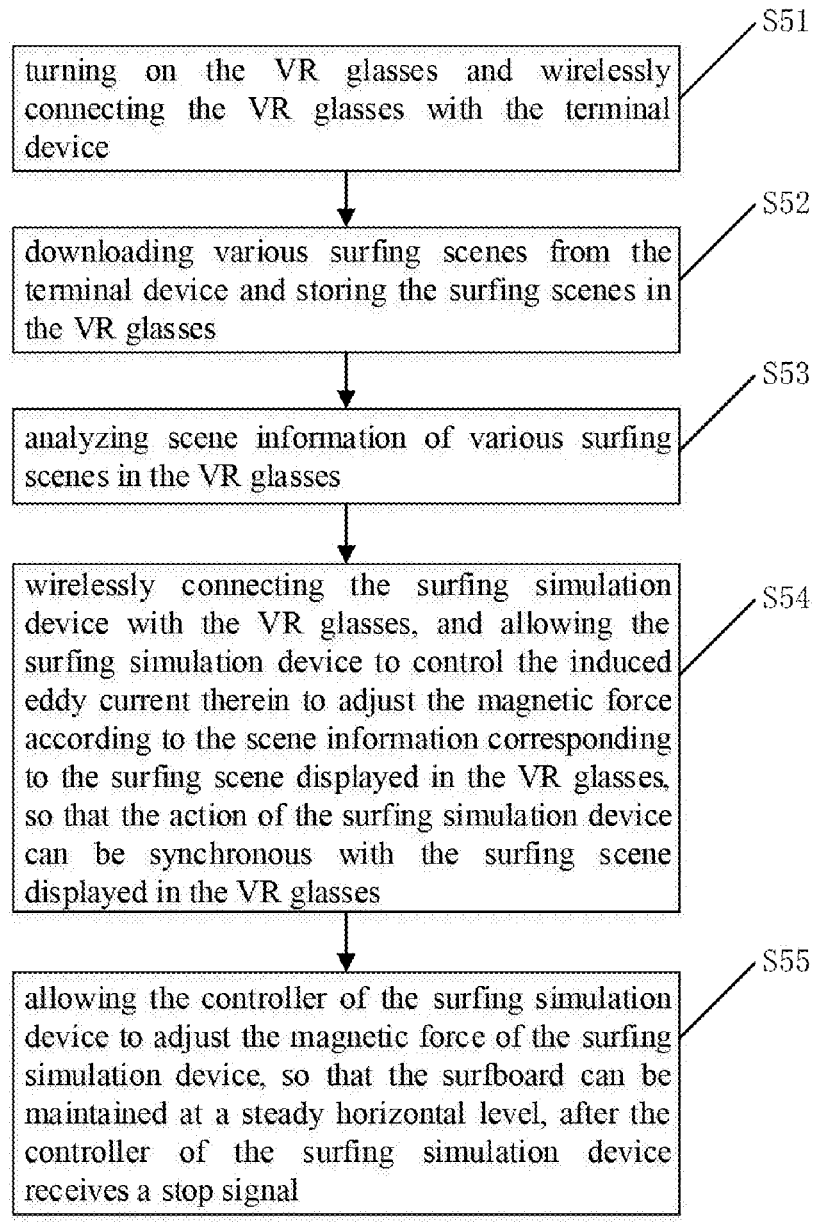
FIG. 5A is a first flowchart illustrating a method of controlling a surfing simulation device in accordance with some embodiments.
Figure 5B:
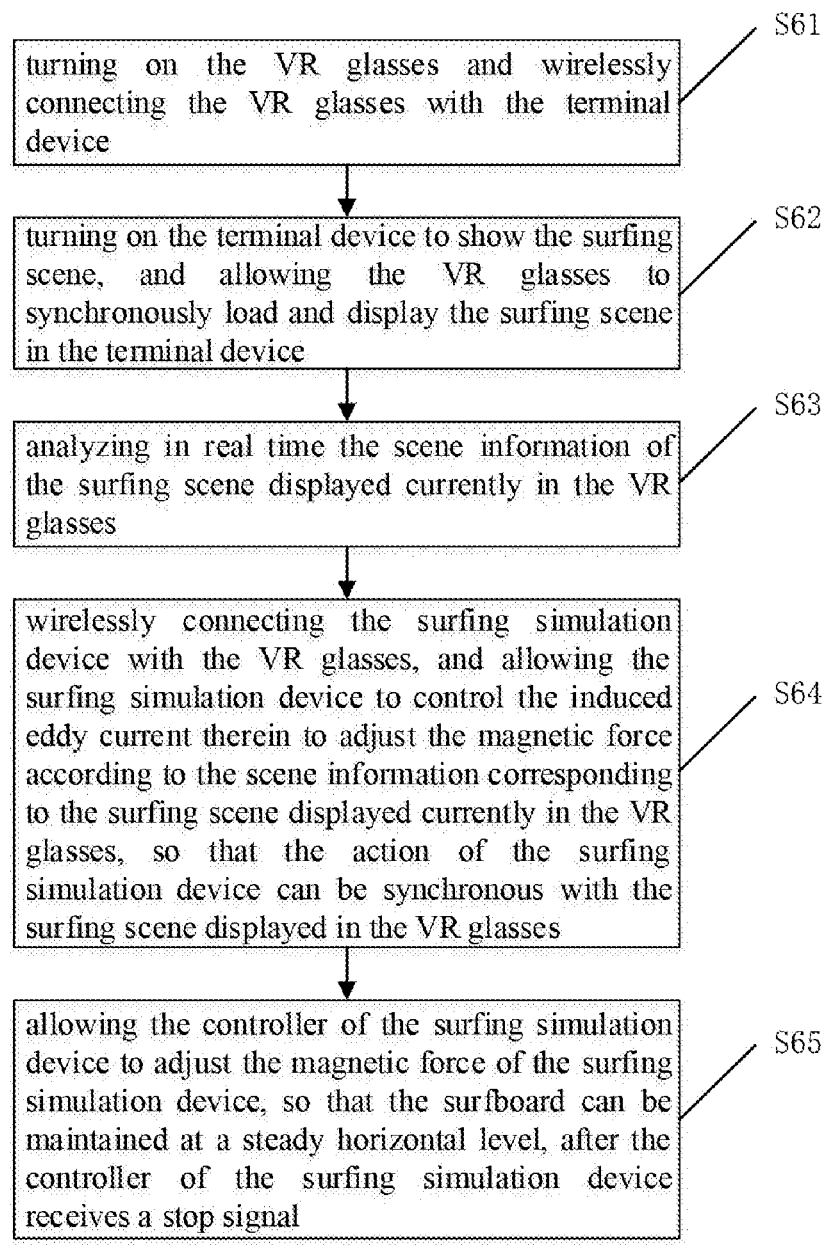
FIG. 5B is a second flowchart illustrating a method of controlling a surfing simulation device in accordance with some embodiments.

FIGS. 5A and 5B are flowcharts illustrating a method of controlling the surfing simulation device in accordance with some embodiments. In the following description, the numbers indicated in the steps are only used to distinguish different steps and do not represent the order of steps.

Referring to FIG. 5A, the method of controlling the surfing simulation device may include:

S51: turning on the VR glasses 101 and wirelessly connecting the VR glasses 101 with the terminal device 201.

S52: downloading various surfing scenes from the terminal device 201 and storing the surfing scenes in the VR glasses 101.

S53: analyzing scene information of various surfing scenes in the VR glasses 101. The scene information of various surfing scenes in the VR glasses 101 may be analyzed by the microprocessor in the VR glasses 101 or the controller in the surfing simulation device 102. The microprocessor in the VR glasses 101 or the controller of the surfing simulation device 102 analyzes moving path information and sea wave information in various surfing scenes. The moving path information includes plane coordinates in X and Y directions. The sea wave information includes the inclination angle, speed and frequency of sea waves. The inclination angle of the sea wave includes 3D coordinates in X, Y and Z directions.

S54: wirelessly connecting the surfing simulation device 102 with the VR glasses 101, and allowing the surfing simulation device 102 to control the induced eddy current therein to adjust the magnetic force according to the scene information corresponding to the surfing scene displayed in the VR glasses 101, so that the action of the surfing simulation device 102 can be synchronous with the surfing scene displayed in the VR glasses 101. In more detail, the controller of the surfing simulation device 102 adjusts the angles and the change rate of the angles of the surfboard 102a in every direction (e.g. side to side, back and forth), according to the plane coordinates in the X and Y directions, the 3D coordinates in the X, Y and Z directions associated with the sea wave angles, and the information about the sea wave speed.

S55: allowing the controller of the surfing simulation device 102 to adjust the magnetic force of the surfing simulation device 102, so that the surfboard 102a can be maintained at a steady horizontal level, after the controller of the surfing simulation device 102 receives a stop signal. The stop signal may be transmitted to the controller of the surfing simulation device 102 through a starting switch or be directly sent by the terminal device 201 to the controller of the surfing simulation device 102.

Referring to FIG. 5B, the method of controlling the surfing simulation device in some other embodiments may include:

S61: turning on the VR glasses 101 and wirelessly connecting the VR glasses 101 with the terminal device 201.

S62: turning on the terminal device 201 to show the surfing scene, and allowing the VR glasses 101 to synchronously load and display the surfing scene in the terminal device 201.

S63: analyzing in real time the scene information of the surfing scene displayed currently in the VR glasses 101. The scene information associated with the surfing scene displayed in the VR glasses 101 may be analyzed by the microprocessor in the VR glasses 101 or the controller of the surfing simulation device 102. The microprocessor in the VR glasses 101 or the controller of the surfing simulation device 102 analyzes moving path information and sea wave information in the surfing scene. The moving path information includes plane coordinates in X and Y directions. The sea wave information includes the inclination angle, speed and frequency of sea waves. The inclination angle of the sea wave includes 3D coordinates in X, Y and Z directions.

S64: wirelessly connecting the surfing simulation device 102 with the VR glasses 101, and allowing the surfing simulation device 102 to control the induced eddy current therein to adjust the magnetic force according to the scene information corresponding to the surfing scene displayed currently in the VR glasses 101, so that the action of the surfing simulation device 102 can be synchronous with the surfing scene displayed currently in the VR glasses 101. In more detail, the controller of the surfing simulation device 102 adjusts the angles and the change rate of the angles of the surfboard 102a in every direction, according to the plane coordinates in the X and Y directions, the 3D coordinates in the X, Y and Z directions associated with the sea wave angles, and the information about the sea wave speed.

S65: allowing the controller of the surfing simulation device 102 to adjust the magnetic force of the surfing simulation device 102, so that the surfboard 102a can be maintained at a steady horizontal level, after the controller of the surfing simulation device 102 receives a stop signal. The stop signal may be transmitted to the controller of the surfing simulation device 102 through a starting switch or be directly sent by the terminal device 201 to the controller of the surfing simulation device 102.

The method described in the present disclosure is not limited to the solution described above, and can be modified in various ways. for example, the VR glasses 101 and the terminal device 201 may be wirelessly connected in advance, and the surfing simulation device 102 and the VR glasses 101 may be wirelessly connected in advance. And then various analyses and controls described above are performed.

Figure 6:
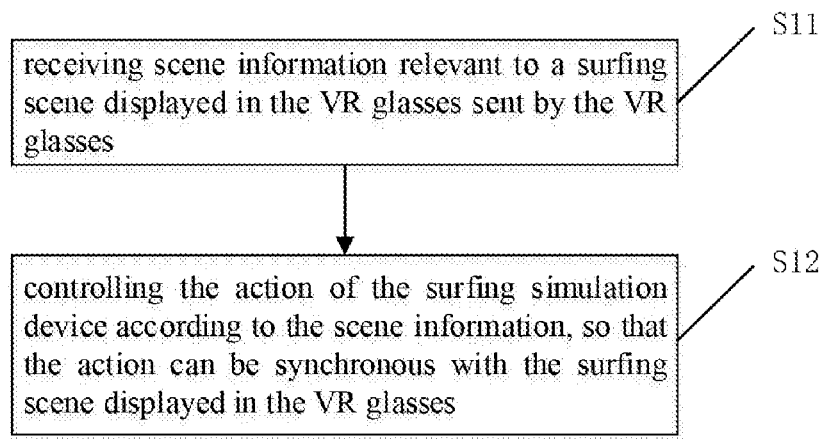
FIG. 6 is a flowchart illustrating a surfing simulation method in accordance with some embodiments.

FIG. 6 is a flowchart illustrating a surfing simulation method in accordance with some embodiments. Referring to FIG. 6, the surfing simulation method is applied to a surfing simulation device which is wirelessly connected with VR glasses. Referring to FIG. 6, the surfing simulation method can include the following operations.

S11: receiving scene information associated with a surfing scene displayed in the VR glasses sent by the VR glasses.

S12: controlling the action of the surfing simulation device according to the scene information, so that the action can be synchronous with the surfing scene displayed in the VR glasses.

In some embodiments, the surfing simulation device includes a surfboard and a surfboard base which are connected with each other by magnetic suspension. The process of controlling the action of the surfing simulation device includes adjusting the magnetic force that supports the surfboard by adjusting the induced eddy current of the surfboard base according to the scene information, so as to control the action of the surfing device through the adjusted magnetic force.

Figure 7:
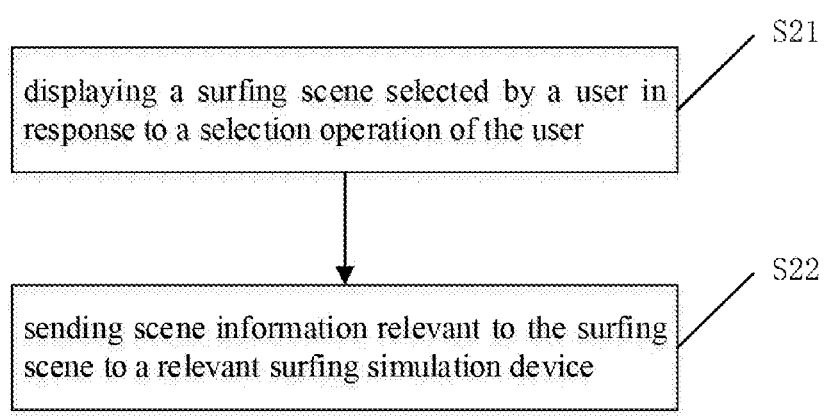
FIG. 7 is a flowchart illustrating a surfing simulation method in accordance with some embodiments.

FIG. 7 is a flowchart illustrating a surfing simulation method in accordance with some embodiments. Referring to FIG. 7, the surfing simulation method can be applied to VR glasses, and can include the following operations.

S21: displaying a surfing scene selected by a user in response to a selection operation of the user.

S22: sending scene information associated with the surfing scene to an associated surfing simulation device.

Wherein, the scene information is used for controlling the action of the surfing simulation device synchronous with the surfing scene displayed in the VR glasses.

In some embodiments of the surfing simulation method, surfing scene may also be transmitted from an associated mobile terminal by the user.

The surfing simulation method applied to the surfing simulation device in the embodiment of the present disclosure and the surfing simulation method applied to the VR glasses are similar to the implementation involved in the interactive process of the surfing simulation device and the VR glasses in the above embodiments. Thus, the implementation of the surfing simulation method applied to the surfing simulation device and the surfing simulation method applied to the VR glasses may refer to relevant description in the above embodiments and will not be further described here in detail.

Based on a similar concept, various embodiments of the present disclosure further provide a surfing simulation device.

Figure 8:
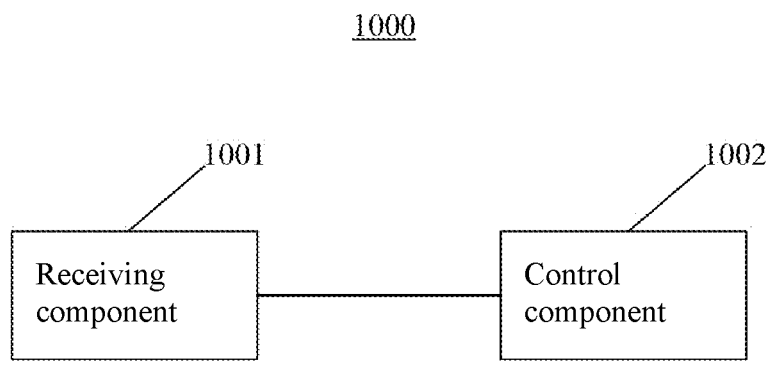
FIG. 8 is a block diagram of a surfing simulation device in accordance with some embodiments.

FIG. 8 is a block diagram of a surfing simulation device in accordance with some embodiments. Referring to FIG. 8, the surfing simulation device 1000 includes a receiving component 1001 and a control component 1002. The surfing simulation device 1000 is wirelessly connected with VR glasses.

The receiving component 1001 is configured to receive scene information associated with a surfing scene displayed in the VR glasses sent by the VR glasses. The control component 1002 is configured to control the action of the surfing simulation device according to the scene information, so that the action can be synchronous with the surfing scene displayed in the VR glasses.

In some embodiments, the surfing simulation device 1000 includes a surfboard and a surfboard base which are connected with each other by magnetic suspension.

The control component 1002 can adjust the induced eddy current of the surfboard base according to the scene information and thereby adjust the magnetic force that supports the surfboard, so as to control the action of the surfing simulation device through the adjusted magnetic force.

Figure 9:
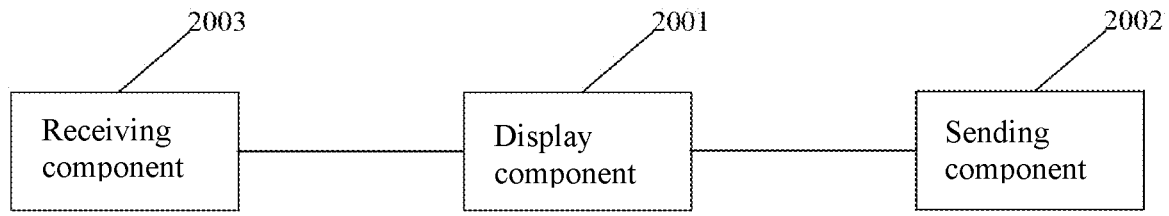
FIG. 9 is a block diagram of a surfing simulation device in accordance with some embodiments.

FIG. 9 is a block diagram illustrating a surfing simulation device in accordance with some embodiments. Referring to FIG. 9, the surfing simulation device 2000 is applied to VR glasses. The surfing simulation device 2000 includes a display component 2001 and a sending component 2002. Wherein, the display component 2001 is configured to display a surfing scene selected by a user in response to a selection operation of the user. The sending component 2002 is configured to send scene information associated with the surfing scene to an associated surfing simulation device. The scene information is used for controlling the action of the surfing simulation device be synchronous with the surfing scene displayed in the VR glasses.

In some embodiments, the surfing simulation device 2000 also includes a receiving component 2003 which is configured to receive the surfing scene send through an associated mobile terminal by the user.

Regarding the device in the above embodiments, the specific manners of operations of each module/unit have been described in detail in the part about the embodiments of the methods, and thereby will not be explained here in detail.

Figure 10:
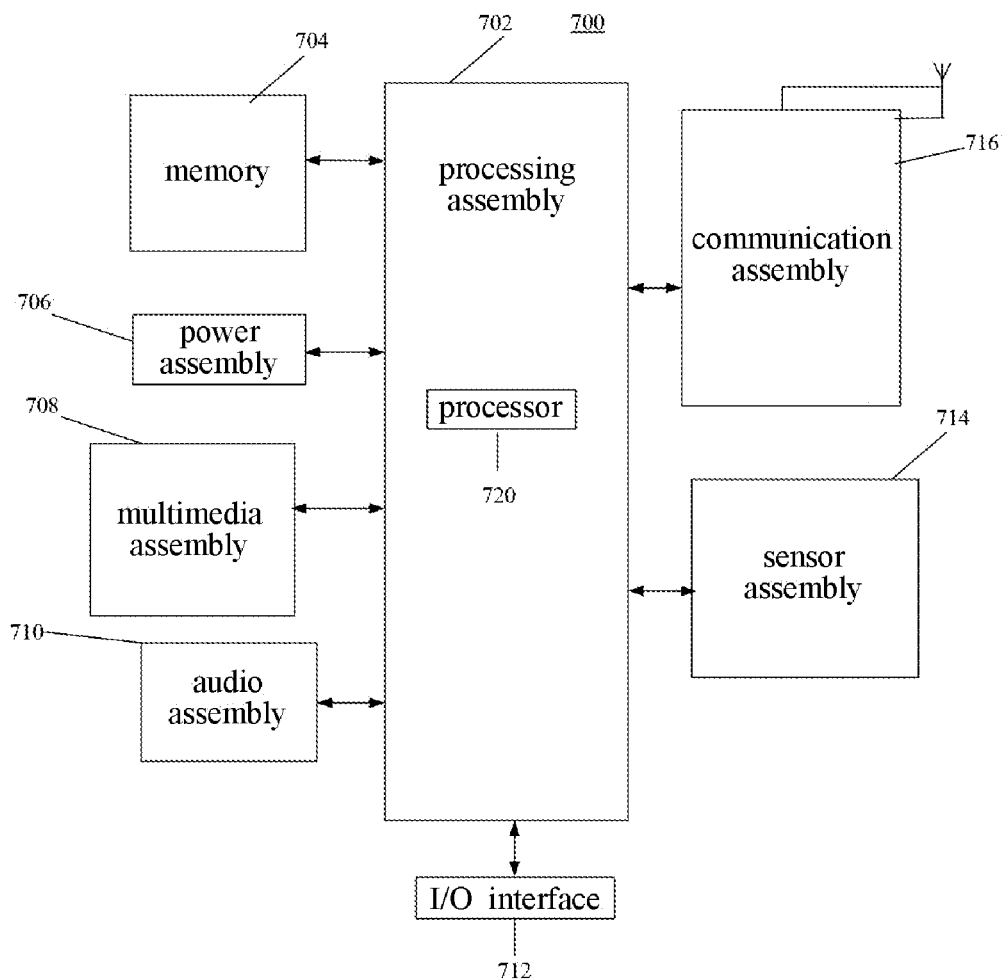
FIG. 10 is a block diagram of a processing device of a surfing simulation device in accordance with some embodiments.

The embodiment of the present disclosure further provides a processing device 700 of a surfing simulation device. FIG. 10 is a block diagram illustrating a processing device of a surfing simulation device in accordance with some embodiments. For example, the device 700 may be a mobile phone, a computer, a digital broadcasting terminal, a messaging device, a game console, a tablet, a medical device, a fitness apparatus, a personal digital assistant, and the like.

Referring to FIG. 10, the device 700 may comprise one or more of a processing assembly 702, a memory 704, a power assembly 706, a multi-media assembly 708, an audio assembly 710, an input/output (I/O) interface 712, a sensor assembly 714 and a communication assembly 716.

The processing assembly 702 typically controls overall operations of the device 700, such as the operations associated with display, telephone calls, data communications, camera operations, and recording operations. The processing assembly 702 may include one or more processors 820 to execute instructions to perform all or part of the steps in the above described methods. for example, the processor 820 is configured to acquire a power saving signal; and determine whether to perform inactive timer timeout processing based on the power saving signal. Moreover, the processing assembly 702 may include one or more modules which facilitate the interaction between the processing assembly 702 and other assemblies. for example, the processing assembly 702 may include a multimedia module to facilitate the interaction between the multimedia assembly 708 and the processing assembly 702.

The memory 704 is configured to store various types of data, for example, instructions executable by the processor 820, to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 706 provides power to various assemblies of the device 700. The power assembly 706 may include a power management system, one or more power sources, and any other assemblies associated with the generation, management, and distribution of power in the device 700.

The multimedia assembly 708 includes a screen providing an output interface between the device 700 and the user. In some embodiments, the screen may include a liquid crystal display (LCD) and a touch panel (TP). In some embodiments, the screen may include an organic light-emitting diode (OLED) display or other types of displays. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia assembly 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio assembly 710 is configured to output and/or input audio signals. For example, the audio assembly 710 includes a microphone (MIC) configured to receive an external audio signal when the device 700 is in an operation mode, such as a call mode, a recording mode, and a voice recognition mode. The received audio signal may be further stored in the memory 704 or transmitted via the communication assembly 716. In some embodiments, the audio assembly 710 further includes a speaker to output audio signals.

The I/O interface 712 provides an interface between the processing assembly 702 and peripheral interface modules, such as a keyboard, a click wheel, buttons, and the like. The buttons may include, but are not limited to, a home button, a volume button, a starting button, and a locking button.

The sensor assembly 714 includes one or more sensors to provide status assessments of various aspects of the device 700. for example, the sensor assembly 714 may detect an open/closed status of the device 700, relative positioning of assemblies, e.g., the display and the keypad, of the device 700, a change in position of the device 700 or a assembly of the device 700, a presence or absence of user contact with the device 700, an orientation or an acceleration/deceleration of the device 700, and a change in temperature of the device 700. The sensor assembly 714 may include a proximity sensor configured to detect the presence of nearby objects without any physical contact. The sensor assembly 714 may also include a light sensor, such as a CMOS or CCD image sensor, for use in imaging applications. In some embodiments, the sensor assembly 714 may also include an accelerometer sensor, a gyroscope sensor, a magnetic sensor, a pressure sensor, or a temperature sensor.

The communication assembly 716 is configured to facilitate communication, wired or wirelessly, between the device 700 and other devices. The device 700 can access a wireless network based on a communication standard, such as Wi-Fi, 2G, 3G, 4G, 5G, or a combination thereof. In one exemplary embodiment, the communication assembly 716 receives a broadcast signal or broadcast associated information from an external broadcast management system via a broadcast channel. In one exemplary embodiment, the communication assembly 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above described methods.

In exemplary embodiments, there is also provided a non-transitory storage medium having stored therein computer-readable instructions, such as the memory 704 having instructions executable by the processor 720 in the device 700, for performing the above-described methods. For example, the non-transitory computer-readable storage medium may be a ROM, a random-access memory (RAM), a CD-ROM, a magnetic tape, a floppy disc, an optical data storage device, and the like. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous.

In some embodiments, the simulation system can be a multi-user system, in which multiple users can play together in the same virtual scenes. The multiple users can be at a same physical location, or at multiple locations around the world. The real-time content can include real time sea wave information from a user-selected location, such as a popular surf site, and multiple user information at the user-selected location. The VR glasses display scenes can therefore simultaneously include the real time sea wave information and the multiple user information, and the user can feel surfing together with multiple other users in the same scenes while coordinating with each other's actions.

Various embodiments of the present disclosure can have the following advantages. The surfboard of the surfing simulation device can make simulating actions in real time by synchronizing with a surfing scene displayed in VR glasses, such that the user can have the immersive experience.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub combination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes some embodiments of the present disclosure, but not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only some embodiments.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or device.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least some embodiments or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of module, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium.

These terms can also refer to the internal connections or the interactions between elements. The specific meanings of the above terms in the present disclosure can be understood by those of ordinary skill in the art on a case-by-case basis.

Dividing the device into different "regions," "module," "components" or "layers," etc. merely reflect various logical functions according to some embodiments, and actual implementations can have other divisions of "regions," "module," "components" or "layers," etc. realizing similar functions as described above, or without divisions. For example, multiple regions, module, or layers, etc. can be combined or can be integrated into another system. In addition, some features can be omitted, and some steps in the methods can be skipped.

Those of ordinary skill in the art will appreciate that the module, components, regions, or layers, etc. in the devices provided by various embodiments described above can be provided in the one or more devices described above. They can also be located in one or multiple devices that is (are) different from the example embodiments described above or illustrated in the accompanying drawings. For example, the module, regions, or layers, etc. in various embodiments described above can be integrated into one module or divided into several sub-modules.

The various device components, modules, units, blocks, or portions may have modular configurations, or are composed of discrete components, but nonetheless can be referred to as "modules," "units," "components," etc. in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A surfing simulation device, wirelessly connected with virtual reality (VR) glasses, the device comprising:
a surfboard,
a surfboard base, and
a controller disposed in the surfboard base,
wherein:
the controller is configured to control actions of the surfboard based on scene information associated with a surfing scene displayed in the VR glasses, such that the actions of the surfboard are synchronous with the surfing scene displayed in the VR glasses;
the scene information includes moving path information and/or sea wave information corresponding to a time;
the moving path information includes direction, speed, and acceleration of plane movement; and
the sea wave information includes surf angle, surf speed, and surf frequency.

2. The surfing simulation device according to claim 1, wherein
the surfboard is coupled with the surfboard base by magnetic suspension.

3. The surfing simulation device according to claim 2, wherein
the control the actions of the surfboard according to the scene information associated with the surfing scene displayed in the VR glasses includes:
allowing the controller to adjust induced eddy current of the surfboard base according to the scene information;
adjusting magnetic force of the surfboard according to the adjusted induced eddy current; and
controlling the actions of the surfboard in accordance with the adjusted magnetic force.

4. The surfing simulation device according to claim 1, further comprising:
a gravity-sensitive switch configured to allow the surfing simulation device to operate only when a body carried by the surfing simulation device has weight over a preset value.

5. A surfing simulation system comprising the surfing simulation device according to claim 1, further comprising the VR glasses.

6. The surfing simulation system according to claim 5, wherein the VR glasses are configured to:
display a surfing scene selected by a user in response to a selection operation of the user; and
send scene information associated with the surfing scene to an associated surfing simulation device,
wherein the scene information is used for controlling the actions of the surfing simulation device, such that the actions are synchronous with the surfing scene displayed in the VR glasses.

7. The surfing simulation system according to claim 6, wherein the surfboard of the surfing simulation device is configured to make simulating actions in real time by synchronizing with the surfing scene displayed in VR glasses to thereby provide a user with immersive experience.

8. The surfing simulation system according to claim 7, further comprising a mobile terminal wirelessly coupled with the VR glasses.

9. The surfing simulation system according to claim 8, wherein the VR glasses are configured to download surfing scenes from the mobile terminal and store the surfing scenes in the VR glasses in advance.

10. The surfing simulation system according to claim 8, wherein the VR glasses are configured to load and display various scenes from the mobile terminal to realize real-time content synchronization between the VR glasses and the mobile terminal.

11. The surfing simulation system according to claim 10, wherein the surfboard and the surfboard base are provided with superconductor electromagnets coils to generate repulsive forces, to thereby suspend the surfboard above the surfboard; and wherein the real-time content comprises real time sea wave information from a user-selected location, and multiple user information at the user-selected location, such that the VR glasses display scenes simultaneously including the real time sea wave information and the multiple user information.

12. A surfing simulation method, applied to a surfing simulation device wirelessly connected with VR glasses, the method comprising:
 receiving scene information associated with a surfing scene displayed in the VR glasses sent by the VR glasses; and
 controlling actions of the surfing simulation device according to the scene information, such that the actions are synchronous with the surfing scene displayed in the VR glasses;
 wherein:
 the scene information includes moving path information and/or sea wave information corresponding to a time;
 the moving path information includes direction, speed, and acceleration of plane movement; and
 the sea wave information includes surf angle, surf speed, and surf frequency.

13. The surfing simulation method according to claim 12, wherein
 the surfing simulation device includes a surfboard and a surfboard base which are connected with each other by magnetic suspension; and
 the control the actions of the surfing simulation device includes: adjusting the induced eddy current of the surfboard base according to the scene information, so as to adjust magnetic force that supports the surfboard, and controlling the actions of the surfing device through the adjusted magnetic force.

14. A surfing simulation device implementing the method according to claim 6, the device comprising:
 a receiving component configured to receive the scene information; and
 a control component configured to control the actions of the surfing simulation device according to the scene information.

15. The surfing simulation device according to claim 14, further comprising a surfboard and a surfboard base coupled with each other by magnetic suspension; and
 the control component controls the actions of the surfing simulation device by the following means: adjusting induced eddy current of the surfboard base according to the scene information, so as to adjust magnetic force that supports the surfboard, and controlling the actions of the surfing device through the adjusted magnetic force.

16. A surfing simulation method, applied to VR glasses, the method comprising:
 displaying a surfing scene selected by a user in response to a selection operation of the user; and
 sending scene information associated with the surfing scene to an associated surfing simulation device,
 wherein:
 the scene information is used for controlling actions of the surfing simulation device, such that the actions are synchronous with the surfing scene displayed in the VR glasses;
 the scene information includes moving path information and/or sea wave information corresponding to a time;
 the moving path information includes direction, speed, and acceleration of plane movement; and
 the sea wave information includes surf angle, surf speed, and surf frequency.

17. The surfing simulation method according to claim 16, further comprising:
 receiving a surfing scene sent by the user through an associated mobile terminal.

18. Virtual reality (VR) glasses implementing the method according to claim 16, the VR glasses comprising:
 a display component configured to display the surfing scene; and
 a sending component configured to send the scene information associated with the surfing scene to the associated surfing simulation device.

19. The VR glasses according to claim 18, further comprising a receiving component configured to receive the surfing scene sent by the user through an associated mobile terminal.

* * * * *